Jan. 12, 1932.  L. D. TITUS  1,840,858
NAIL PULLER
Filed July 23, 1929  2 Sheets-Sheet 1
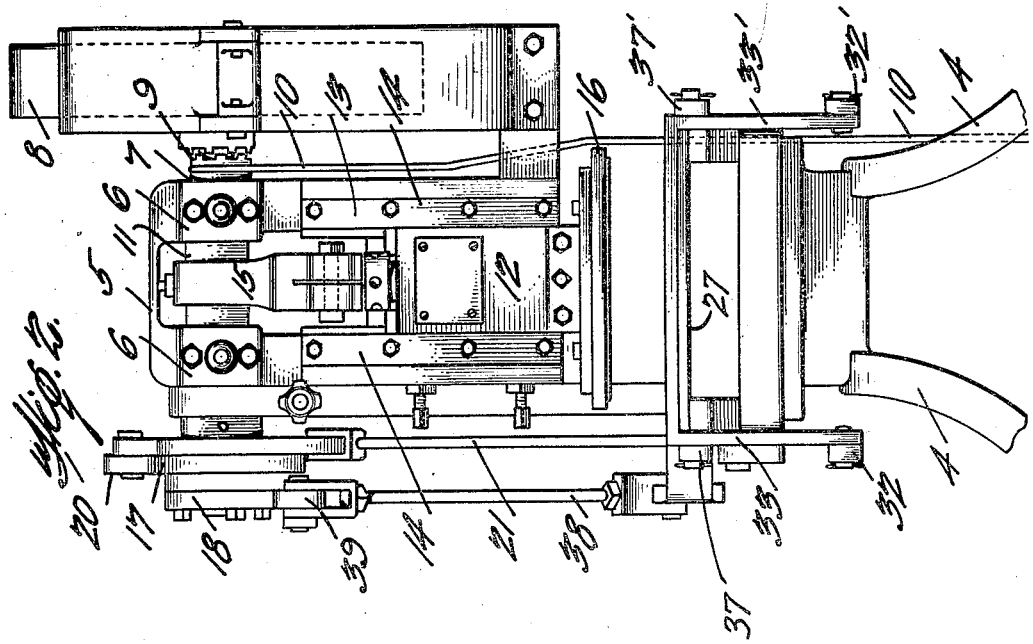
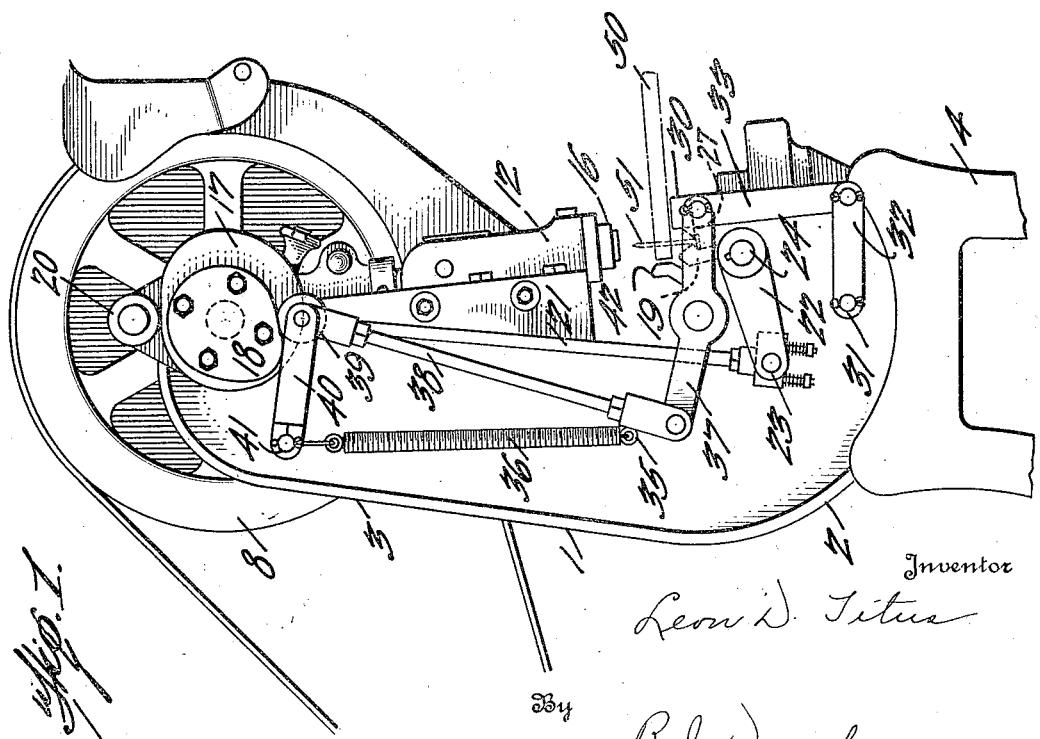
Inventor
Leon D. Titus
By
R. J. Dearlove Attorney

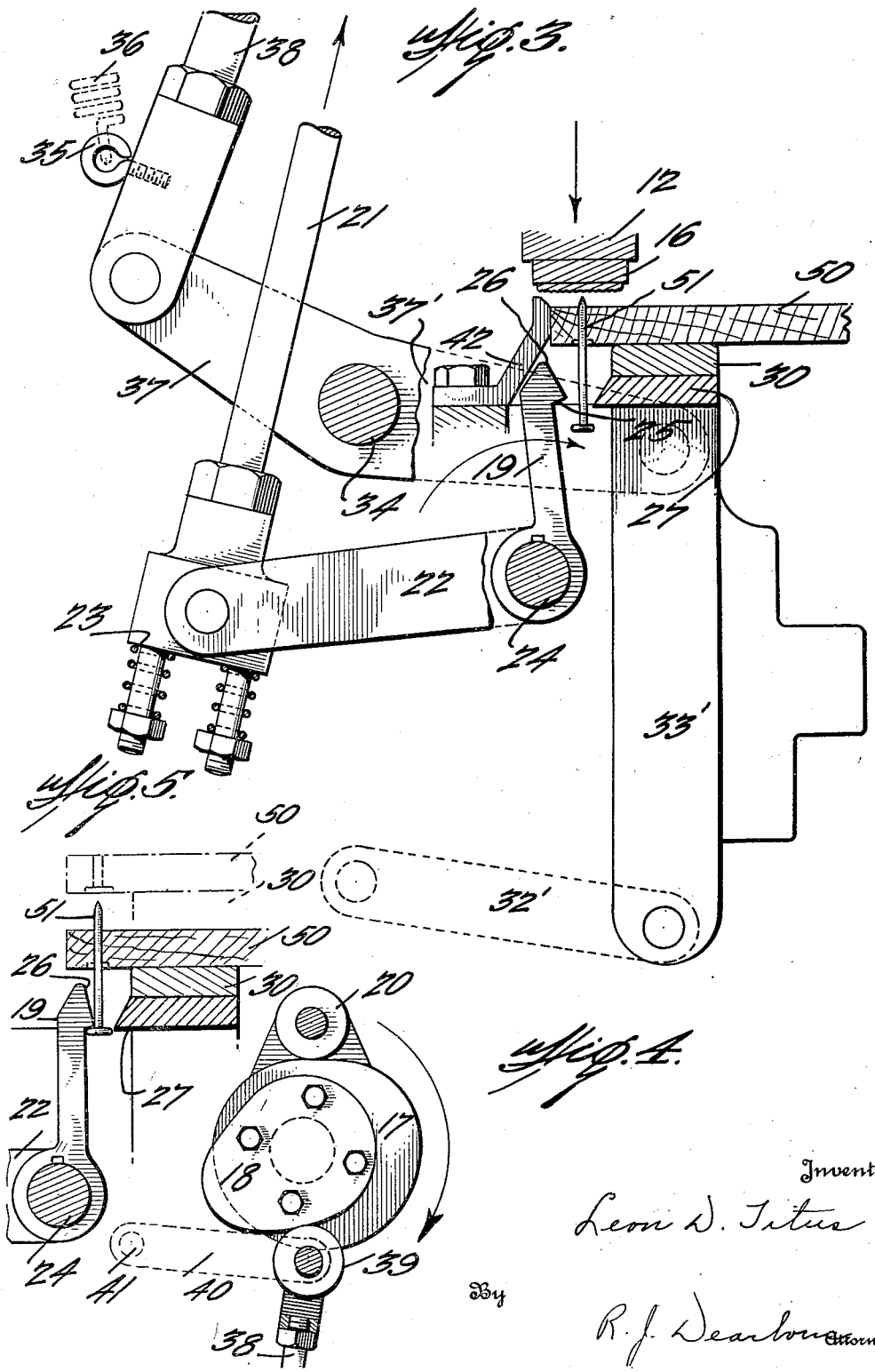

Patented Jan. 12, 1932

1,840,858

UNITED STATES PATENT OFFICE

LEON D. TITUS, OF PORT ARTHUR, TEXAS, ASSIGNOR TO THE TEXAS COMPANY, OF NEW YORK, N. Y., A CORPORATION OF DELAWARE

NAIL PULLER

Application filed July 23, 1929. Serial No. 380,431.

This invention relates to nail pulling machines and has for an object to provide a machine which will quickly extract one or more nails from a piece of lumber without the necessity of painstaking and tedious labor on the part of the operator.

Another object of this invention is to provide a machine by which a nail will be completely extracted from a plank in a single cycle of operation of the machine.

A further object of the invention is to provide a machine which will extract nails from lumber without unnecessary tearing, splintering or splitting of the lumber, and which will leave the nails in condition to be reclaimed.

Another object thereof is to provide a machine in the operation of which a nail to be extracted from a plank will be pushed backwardly through the nail-hole by pressure upon the point of the nail until the head is spaced from the adjacent surface of the plank, and will then be completely extracted by holding the nail stationary by engaging the shank or head thereof and moving the plank in the direction necessary to complete the extraction.

In the drawings, representing a preferred embodiment of the invention; Fig. 1 is a side view of the machine;

Fig. 2 is a front view;

Fig. 3 is a side view of some of the extracting mechanism;

Fig. 4 is a side view of the cams which control the operation of part of the mechanism;

Fig. 5 is a view showing the mechanism for performing the final extraction in operative position.

Numeral 1 refers to the frame of the machine. This frame is composed of a base portion 2 and an upward extension 3. The frame is mounted upon a suitable support 4 by which the machine is held at the proper elevation for convenient use by the operator.

The upper portion of frame extension 3 is forked as at 5, and each fork is provided with a bearing 6 for a main drive-shaft 7. Shaft 7 may be rotated by any convenient drive means, as by pulley wheel 8. Preferably some means should be provided for connecting and disconnecting drive shaft 7 with wheel 8 and to this end clutch 9 is shown but, of itself, forms no part of this invention. The clutch may be operated by any convenient operating mechanism as by hand or foot levers (not shown) acting through lever 10.

Between bearings 6, shaft 7 is formed with an offset or crank portion 11 which acts to reciprocate plunger 12. Plunger 12 is guided in its reciprocatory motion by guideways 13 formed in the frame of the machine and removable plates 14. The plunger is operated through connecting rod 15 connected to crank 11 and plunger 12 in a conventional manner. The bottom surface of plunger 12 may be roughened in the manner of a rasp or may be provided with a removable plate 16 having a roughened lower surface.

A pair of angularly spaced cams 17 and 18 are secured upon the free end of shaft 7 and are driven thereby. Cam 17 constitutes the driving means for a rocking nail clamp 19 through the following mechanism. A cam follower 20 engages cam 17 and imparts reciprocatory movement to a rod 21, the lower end of which is yieldingly connected to one end of a lever 22 as at 23. The other end of lever 22 is secured to a rock shaft 24 so as to impart a rocking motion thereto. Rocking clamp 19 comprises an elongated plate or bar coextensive in length with the width of plunger element 16. The bar is provided with an elongated overhanging shoulder 25, and the upper edge of the bar may be bevelled as indicated at 26.

A plate 27 may be secured to a part of the frame of the machine in position to cooperate with the operation of clamp 19. Clamp 19 performs its function by pressing the shank or head of a nail to be extracted against plate 27. The upper edge of plate 27 may be bevelled to assist in guiding a nail into proper position to be engaged by clamp 19.

A movable support 30 may be provided for the plank or work 50 from which a nail 51 is to be extracted. The support is located slightly above and in front of the clamping device above described, and in such relative position that when a plank containing a nail to be extracted is properly located on the support the nail will be in position to be struck by descending plunger 12.

Support 30 is movable upwardly and downwardly through connection with cam 18, on the outer end of shaft 7 by means of the following mechanism: An arm 40 is pivoted at one end to the frame of the machine as at stud 41, and a cam follower 39 engaging the cam 18 is secured to the free end of said arm. A rod 38 has its upper end secured to the free end of arm 40, and its lower end attached to a rock lever 37. A coil spring 36 is attached at its upper end to a fixed part of the machine such as stud 41, and its lower end may be attached to a lower part of rod 38 as at 35 so as to exert an upward pull on rod 38 and acting to hold cam follower 39 in engagement with cam 18. Rock lever 37 is fixedly secured at a central point to one end of a horizontal shaft 34 extending the entire width of the frame and has a corresponding lever 37' fixedly secured on its opposite end so as to be rocked simultaneously with lever 37. Support 30 is provided at each end with a depending arm 33—33' and the upper portions of these arms may be connected to rock levers 37 and 37' respectively, so that these arms and consequently support 30 are raised and lowered by the rocking of rock levers 37—37'. The lower ends of arms 33—33' are attached to the free ends of a pair of pivoted arms 32—32', the opposite ends of which are pivoted on opposite sides of the frame of the machine as indicated at 31. The length of arms 32—32' is substantially equal to the length of rock levers 37—37' beyond shaft 34, so that turning movement of arms 33—33' and support 30 is prevented.

When the machine is to be used to extract nails from a large number of planks having nails located at substantially equal distances from one edge, a guide stop 42 may be provided to assist the operator to quickly locate the planks in proper position to be operated on.

In the operation of the machine, the operator places a piece of material from which nails are to be extracted on the support 30, as shown in Fig. 1, with the nail point protruding upwardly and in such position that the plunger 12 will strike the nails when it descends. The operator then manipulates the clutch controlling mechanism to throw clutch 9 into engagement so that shaft 7 will be driven by pulley wheel 8. As shaft 7 rotates crank 11 will cause plunger 12 to descend and strike the points of the nails to be extracted pushing them downwardly until the heads and shanks protrude from the lower surface of the plank, as shown in Fig. 3. The roughened lower surface of plunger prevents the nails from slipping during the down stroke, in an obvious manner. As soon as the plunger reaches its lowest position its direction is reversed, and returns toward its initial position.

The clamping plate 19 is now rocked to the right as indicated by the arrow in Fig. 3, to the position shown in Fig. 5, by cam 17 through mechanism previously described. The clamping plate lightly grips and holds the shanks and heads of the nails between itself and plate 27.

Support 30 now moves upwardly by the action of cam 18 and connecting mechanism, carrying the plank upwardly. The nails being held by the clamping device are completely withdrawn from the plank as shown in dotted lines in Fig. 5. Clamping plate 19 now rocks to the left releasing the nails and allowing them to drop from the machine into a suitable receptacle or upon the floor. Further rotation of cam 18 permits support 30 to descend to its initial position, and the operator may stop the operation of the machine by disengaging clutch 9, and removal of the plank will leave the parts of the machine in the position from which a subsequent extracting operation may be started.

It is apparent that a number of nails may be extracted from a plank in a single cycle of operation of the machine when the nails are so located that more than one can be placed in alignment with the plunger at the same time. This machine is therefore of great utility in the reclamation of materials from used boxes, the parts of which oftentimes have a number of nails driven in substantially a straight line adjacent one or more edges.

It is to be noted that the operation of the machine is simple, and involves only slight labor on the part of the operator, thus enabling a single workman to accomplish in a short time the work ordinarily requiring a number of men.

Furthermore, it is to be noted that in the operation of this machine the nail to be extracted is completely removed in a single cycle of operations and without bending or other mutilation of either the nail or plank.

I claim:

1. In a machine for extracting nails, a movable support for the body from which a nail is to be extracted, a reciprocating plunger for engaging the point of the nail and pushing the nail backwardly through said body, means for engaging and holding the partially removed nail, and means for moving said support relative to the nail, to complete the extraction.

2. In a machine for extracting nails from planks, means for engaging and holding the nail to be extracted, and means for moving the plank in a direction to extract the nail while the latter is engaged by the holding means, and cam controlled means for actuating the nail holding and plank moving means in timely succession.

3. In a machine for extracting nails from planks, means for initially supporting the plank from which a nail is to be extracted, means for pushing the nail to be extracted backwardly to space the nail-head from the adjacent surface of the plank, means for engaging and holding the partially removed nail, and means for producing further relative movement between the nail and plank to complete the extraction.

4. In a machine for extracting nails from planks, a support upon which a plank containing a nail to be extracted is adapted to be placed with the nail-point protruding upwardly, means for engaging the nail-point and pushing the nail downwardly, means for gripping the nail shank below the plank and holding the nail stationary, and means for moving said support upwardly.

5. In a machine for extracting nails from a plank or the like, comprising a movable support for the work, a plunger cooperating therewith, means for reciprocating the plunger to cause it to engage and partially remove the nails by moving them relative to the work and support, clamping means for gripping and holding the partially removed nails, and means for raising the said work support while the nails are gripped to complete the extracting operation, cams for operating the two said means in a definite sequence and subsequent to the operative stroke of the plunger.

6. In a machine for extracting nails from planks, a drive shaft, a plunger, means for reciprocating the plunger to cause it to engage the point of a nail to be extracted and pushing the nail backwardly through the plank, a nail clamp, a movable support for the plank from which a nail is to be extracted, means on said drive shaft for operating the plunger, a cam on said shaft for operating the clamp, to cause it to engage the nail after the plunger has pushed it backwardly through the plank, and a cam on said shaft for operating said support to move it while the clamp is engaging the nail in order that the plank may be separated from the nail.

7. In a machine of the kind described, rotary drive means, a driven shaft, means for connecting and disconnecting the shaft with the drive means, a crank on the shaft, a plunger connected with said crank, a cam on said shaft, a nail gripper operatively connected with said cam, a second cam on said shaft, and a movable support operatively connected with said second cam.

8. In a machine for extracting nails from planks, the combination with a frame and a movable member adapted to support a plank, of means for moving said support vertically comprising, a horizontally disposed rotatable shaft, a cam secured on said shaft, a cam-follower engaging said cam, a link having one end secured to the cam-follower and the other pivotally attached to one end of a centrally pivoted lever, said lever having its other end attached to said support and means for rotating said shaft.

9. In a machine for extracting nails from planks, a support upon which a plank containing a nail to be extracted is adapted to be placed with the nail-point protruding from the plank, means for forcibly pushing the nail through the plank to space the nail-head from the adjacent surface of the plank, means for gripping the nail shank between its head and the plank and means for effecting relative movement between the support and the nail to completely extract the nail from the plank.

In witness whereof I have hereunto set my hand this 2nd day of July, 1929.

L. D. TITUS.